(12) United States Patent
Fergason

(10) Patent No.: US 6,379,009 B1
(45) Date of Patent: Apr. 30, 2002

(54) CONJUGATE OPTICS PROJECTION DISPLAY WITH IMAGE ENHANCEMENT

(76) Inventor: James L. Fergason, 158 Almendral Ave., Atherton, CA (US) 94027-3902

( * ) Notice: Subject to any disclaimer, the term of this patent is extended or adjusted under 35 U.S.C. 154(b) by 0 days.

(21) Appl. No.: 09/538,454

(22) Filed: Mar. 30, 2000

Related U.S. Application Data

(63) Continuation-in-part of application No. 08/845,520, filed on Apr. 24, 1997, now abandoned.
(60) Provisional application No. 60/016,183, filed on Apr. 24, 1996.

(51) Int. Cl.[7] .............................................. G03B 21/14
(52) U.S. Cl. .............................. 353/28; 359/630; 345/9
(58) Field of Search .............................. 353/12, 13, 28, 353/30, 98; 359/629, 630, 633; 345/7, 8, 9

(56) References Cited

U.S. PATENT DOCUMENTS

| | | |
|---|---|---|
| 2,482,115 A | 9/1949 | Laird, Jr. |
| 2,581,000 A | 1/1952 | Copeland |
| 2,698,553 A | 1/1955 | Copeland |
| 2,782,681 A | 2/1957 | Copeland |
| 2,883,908 A | 4/1959 | Copeland |
| 3,200,702 A | 8/1965 | Giordano |
| 3,447,854 A | 6/1969 | Minter |
| 3,609,007 A | 9/1971 | Peek |
| 3,620,592 A | 11/1971 | Freeman |
| 3,657,981 A | 4/1972 | Benton |
| 3,767,291 A | 10/1973 | Johnson |
| 3,767,305 A | 10/1973 | Craven |
| 3,772,507 A | 11/1973 | Hills |
| 3,832,038 A | 8/1974 | Johnson |
| 4,097,128 A | 6/1978 | Matsumoto et al. |
| 4,114,990 A | 9/1978 | Mash et al. |
| 4,153,913 A | 5/1979 | Swift |
| 4,200,366 A | 4/1980 | Freeman |
| 4,205,224 A | 5/1980 | Mecklenborg |
| 4,207,467 A | 6/1980 | Doyle |

(List continued on next page.)

FOREIGN PATENT DOCUMENTS

| | | |
|---|---|---|
| GB | 2 033 602 | 5/1980 |
| JP | 56-114931 | 9/1981 |
| JP | 62-47623 | 3/1987 |
| JP | 63-13018 | 1/1988 |
| WO | 92/18971 | 10/1992 |
| WO | 96/06378 | 2/1996 |

Primary Examiner—William Dowling
(74) Attorney, Agent, or Firm—Renner, Otto, Boisselle & Sklar, LLP

(57) ABSTRACT

A projected image is overlaid on an actual view of an object, the image being identical to the actual view in size, shape and scale, and being perfectly registered with the actual view, e.g., as to position or location, and, accordingly being substantially parallax-free. The image may be of different "color" than the actual view, i.e., one may be a view or image of light in a visible wavelength region, band or bandwidth, and the other may be a view or image in a non-visible wavelength region, band or bandwidth, such as a view or image of infrared light or of x-ray radiation. The infrared view or image may be converted to a view or image in the visible bandwidth for viewing by a person. The image mentioned above may be a real image of an actual view of an object, scene or the like. Alternatively, the image may be an image other than of an actual view of an object, for example being a previously-obtained image along a same or similar point of view as the actual view of the object, scene, or the like. As another example, the image may be a computer-generated image based on previously-obtained data regarding the object, scene, or the like. The image may be an image obtained by a camera or some other means and then delivered, e.g., as by projection via a projector and conjugate optics, for superpositioning with respect to the real or actual view for viewing by a user.

41 Claims, 2 Drawing Sheets

U.S. PATENT DOCUMENTS

| | | |
|---|---|---|
| 4,347,507 A | 8/1982 | Spooner |
| 4,347,508 A | 8/1982 | Spooner |
| 4,348,185 A | 9/1982 | Bregalia et al. |
| 4,385,806 A | 5/1983 | Fergason |
| 4,509,837 A | 4/1985 | Kassies |
| 4,540,243 A | 9/1985 | Fergason |
| 4,548,470 A | 10/1985 | Erland |
| 4,561,722 A | 12/1985 | Smetana |
| 4,609,253 A | 9/1986 | Perisic |
| 4,647,967 A | 3/1987 | Kirschner et al. |
| 4,648,691 A | 3/1987 | Oguchi et al. |
| RE32,521 E | 10/1987 | Fergason |
| 4,775,217 A | 10/1988 | Ellis .......................... 359/404 |
| 4,840,455 A | 6/1989 | Kempf |
| 4,987,410 A | 1/1991 | Berman et al. |
| 4,994,794 A | 2/1991 | Price et al. |
| 4,997,263 A | 3/1991 | Cohen et al. |
| 5,015,096 A | 5/1991 | Kowalski et al. ........... 356/371 |
| 5,151,722 A | 9/1992 | Massoff |
| 5,189,452 A | 2/1993 | Hodson et al. ............... 353/94 |
| 5,293,271 A | 3/1994 | Merritt et al. ............... 359/631 |
| 5,337,096 A | 8/1994 | Qu et al. ........................ 353/7 |
| 5,388,276 A | 2/1995 | Holmes ....................... 359/630 |
| 5,418,584 A | 5/1995 | Larson ....................... 353/122 |
| 5,483,307 A | 1/1996 | Anderson ................... 359/630 |
| 5,499,138 A | 3/1996 | Iba ............................. 359/619 |
| 5,526,184 A | 6/1996 | Tokuhashi et al. .......... 359/630 |
| 5,546,227 A | 8/1996 | Yasugaki et al. ........... 359/633 |
| 5,572,229 A | 11/1996 | Fisher ........................... 345/8 |
| 5,601,352 A | 2/1997 | Okamura ...................... 353/31 |
| 5,606,458 A | 2/1997 | Fergason .................... 359/630 |
| 5,621,572 A | 4/1997 | Fergason .................... 359/630 |
| 5,625,493 A | 4/1997 | Matsumara et al. ........ 359/633 |
| 5,708,529 A | 1/1998 | Togino et al. .............. 359/630 |
| 5,726,806 A | 3/1998 | Holden et al. .............. 359/633 |
| 5,782,547 A | 7/1998 | Machtig et al. ............... 353/30 |
| 6,045,229 A * | 4/2000 | Tachi et al. .................... 353/28 |
| 6,084,557 A * | 7/2000 | Ishida et al. .................... 345/9 |
| 6,271,895 B2 * | 8/2001 | Takagi et al. ................. 349/11 |
| 6,304,386 B1 * | 10/2001 | Potin .......................... 359/630 |

\* cited by examiner

CONJUGATE OPTICS PROJECTION DISPLAY WITH IMAGE ENHANCEMENT

This is a continuation-in-part of U.S. Application No. 08/845,520, filed Apr. 24, 1997, abandoned, which in turn claims the benefit of U.S. Provisional Application No. 60/016,183, filed Apr. 24,1996.

CROSS-REFERENCE To RELATED PATENT APPLICATIONS

Reference is made to copending U.S. patent application Ser. No. 08/295,383, filed Aug. 24, 1994, entitled "Optical system for a head mounted display using a retroreflector and method of displaying an image," to copending U.S. patent application Ser. No. 08/383,466, filed Feb. 3, 1995, entitled "Head mounted display and viewing system using a remote retroreflector and method of displaying and viewing an image", and to PCT patent application No. US95/07306, filed Jun. 7, 1995, entitled "Head mounted display and viewing system using a remote retro-reflector and method of displaying and viewing an image" (International Publication No. WO 96/06378, published Feb. 29, 1996), the entire disclosures of which hereby are incorporated by reference.

Reference is also made to pending U.S. Application Ser. No. 08/845,520, filed Apr. 24, 1997, which in turn claims the benefit of U.S. Provisional Application 60/016,183, filed Apr. 24, 1996—both of these are hereby incorporated by reference.

TECHNICAL FIELD

This invention relates generally, as indicated, to a projection display system with conjugate optics and image enhancement characteristics.

BACKGROUND

Several prior conjugate optics systems have been employed for displaying and viewing images. The systems may be head mounted in whole or in part or may be otherwise positioned relative to a viewer. Such systems use conjugate optics, for example, including a retroreflector which may be proximate or relatively remote from the viewer.

In conventional night vision goggles, which is an example of a device in which there is enhancement of an image which is otherwise difficult to view, electromagnetic energy input, such as that in the visible wavelength range (sometimes referred to as visible wavelength band or bandwidth) or in another wavelength range, such as infrared, is received by a detector and is enhanced, e.g., by converting the infrared radiation to visible light that can be seen by the user. There are a number of problems with such devices. One problem is the blinding light that is presented to the eyes of a viewer, say when a bright light, such as that from a flare, is provided as an input. Another problem is that such devices usually do not take advantage of the ambient light conditions which would otherwise allow the user to see an image even without enhancement. A further disadvantage with such systems is the relatively narrow field of view over which a user can see while wearing such device.

Accordingly, there is a strong need in the art to improve the enhancement techniques for viewed images.

There also is a strong need in the art to overcome the aforementioned problems previously encountered in night vision goggles and other vision enhancement devices.

SUMMARY

With the foregoing in mind, the present invention provides improvements in techniques to enhance images for viewing or the like.

In an embodiment of the invention a projected image is overlaid on an actual view of an object, the image being identical to the actual view in size, shape and scale, and being perfectly registered with the actual view, e.g; as to position or location, and, accordingly, being substantially parallax-free. The image may be of different "color" than the actual view, i.e., one may be a view or image of light in a visible wavelength region, band or bandwidth, and the other may be a view or image in a non-visible wavelength region, band or bandwidth, such as a view or image of infrared light or of x-ray radiation. The infrared view or image may be converted to a view or image in the visible bandwidth for viewing by a person.

The image mentioned above may be a real image of an actual view of an object, scene or the like. Alternatively, the image may be an image other than of an actual view of an object, for example being a previously-obtained image along a same or similar point of view as the actual view of the object, scene, or the like. As another example, the image may be a computer-generated image based on previously-obtained data regarding the object, scene, or the like. The image may be an image obtained by a camera or some other means and then delivered, e.g., as by projection via a projector and conjugate optics, for superpositioning with respect to the real or actual view for viewing by a user.

The present invention may use the various conjugate optics projection and display systems of the above-mentioned patent applications. Additionally, the invention involves the use of a camera type device, such as a charge coupled device (CCD), video camera, or the like, which is mounted in conjugate relation to the projector of a conjugate optics system of the type disclosed in the above-mentioned patent applications. The system allows the user to view the actual scene, say as by looking directly at a real life scene (not necessarily one that is generated by a projection or other display system). Meanwhile, the camera device can photograph the same scene and delivers the obtained image via a projector and conjugate optics display apparatus for viewing by the user. The image seen directly by the user and the image which is photographed and is projected via the conjugate optics are superimposed in precise registry for viewing by the user. Therefore, when there is adequate illumination to view, for example, the real life scene directly, the user will do so while peering at that scene. However, when there is inadequate illumination for direct visual viewing, the camera, projector and conjugate optics system presents the same view to the user. The user need not even know that the system of the invention is enhancing an image while the user is viewing the image; that is, the viewer may not even realize whether the scene being seen is that which the user is directly viewing or is one developed by the camera, projector and conjugate optics system.

One or more of these and other aspects, objects, features and advantages of the present invention are accomplished using the invention described and claimed below.

To the accomplishment of the foregoing and related ends, the invention, then, comprises the features hereinafter fully described and particularly pointed out in the claims. The following description and, the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DESCRIPTION

In the description below, reference is made to the drawings.

Figure 1:
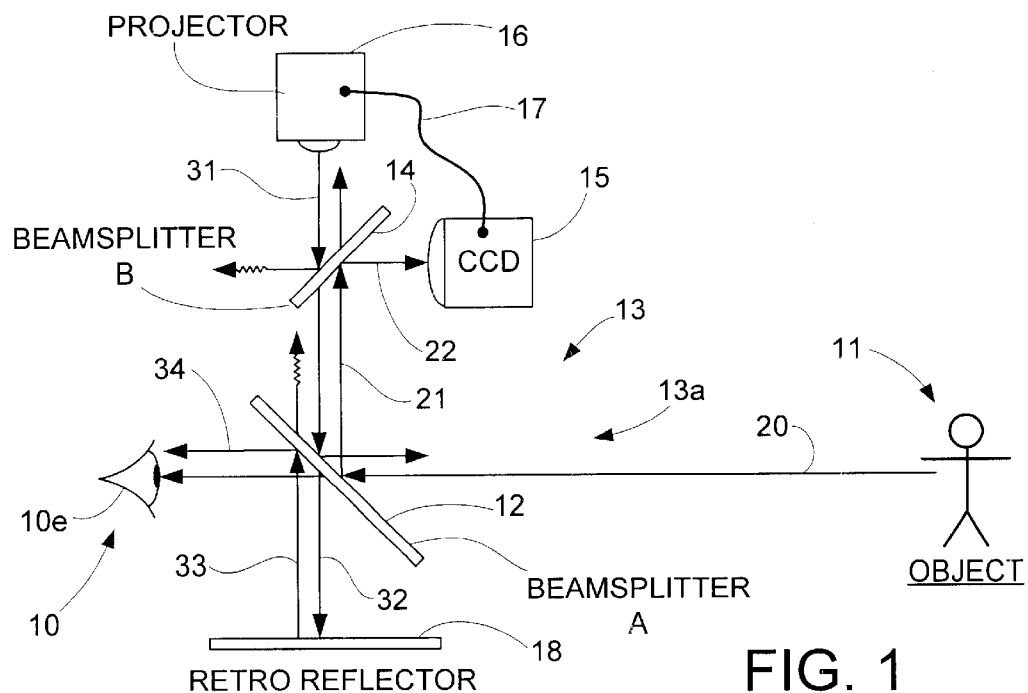
FIG. 1 is a schematic illustration of a conjugate optics projection display with image enhancement in accordance with an embodiment of the invention.

One example of the invention for enhancing a poorly lighted object or scene for a purpose similar to night vision devices, is shown in FIG. 1. In FIG. 1 a viewer 10, which is represented by the illustration of an eye: 10e, is intending to view a scene or object 11. The real life or real world scene 11 may be viewed by the viewer 10 by looking directly through a beamsplitter device 12. The conjugate optics projection display with image enhancement 13 includes the beamsplitter 12, a second beamsplitter 14, a camera 15, a projector 16, the camera and projector being coupled together by a connection 17 representing wires, appropriate signal processing circuitry or the like, and a retroreflector 18.

Consider first the direct (or real world) observation/view of the object 11. The object 11 is observed by the viewer 10 through the beamsplitter 12. That portion of the light traveling along the light path 20 (hereinafter reference numeral 20 may be used to represent the light path or the light in that light path; and similar convention will be used for other lights and light paths described below) from the object 11 transmitted by the beamsplitter 12 goes directly to the viewer's eye 10e. The eye may or may not "see" this light, depending upon the wavelength of the light, e.g., is it in the visible wavelength region or is it in the infrared, ultraviolet or some other wavelength, and possibly also depending on its intensity, e.g., is the intensity so small that it-cannot be perceived by the eye 10e.

That portion of the light 20 that is reflected by the beamsplitter 12 is directed upward along light path 21 to the second beamnsplitter 14. A portion of the light 21 reaching the second beamsplitter 14 is reflected along light path 22 to the camera 15. The remaining portion of the light 21 reaching the second beamsplitter is transmitted through to the conjugate optics projector 16 and can be considered lost.

The camera 15 may be a conventional video camera. It may be a CCD device. (Reference to camera, video camera and CCD may be used interchangeably herein.) In an embodiment the camera 15 is a CCD which is tuned to be sensitive to a desired bandwidth. In an embodiment that bandwidth is the infrared portion of the electromagnetic energy spectrum or a part of that infrared portion.

The image detected by the CCD 15 is electronically transmitted by the connection and/or additional signal processing and/or other circuitry 17 to the projector 16. The projector 16 projects an image into the conjugate optics portion 30 of the system 13. Such projected image is in the visible bandwidth and is of "adequate" brightness. Adequate brightness may be a brightness that is sufficient to be perceived by the viewer 10 under specified ambient light conditions, such as low light level; may be such that the image can be perceived under some other light conditions; may be such that the image will not interfere with the image of the object 11 that is directly viewed by the viewer 10 through the beamsplitter 12, and so forth, as may be desired.

The light projected by the projector 16 is shown at 31. A portion 32 of the projected light 31 is transmitted through both. the second beamsplitter 14 and the beamsplitter 12, reaching the retroreflector 18. The retroreflector 18 returns the light along a conjugate path as light 33 to the beamnsplitter 12, where a portion 34 of the light is reflected to the user's eye 10e. The drawings hereof are only schematic. Therefore, although the light paths 32 and 33 are shown at slightly spaced apart locations, it will be appreciated that those light paths are conjugate and, therefore are identical (but in opposite directions) between the retroreflector 18 and the beamsplitter 12.

The camera 15 and the projector 16 are properly adjusted and aligned so that the projector image of the object 11 returned by the retroreflector 18 and reflected by the beamsplitter 12 to the viewer will be superimposed on the actual view of the object 11 seen by the viewer 10.

The system 13 can be used to intensify an image simply by using the projector 16 to project an image that has the same wavelength characteristics as the wavelength characteristics of the actual object 11, i.e., the same as the wavelength(s) of the light emanating from the object 11.

Alternatively, the system 13 can be used to superimpose a projected image of one wavelength upon an actual view of a second wavelength. This would be an exemplary case for a night vision type of device or system. The system 13 has several advantages over traditional night vision devices.

One of those advantages is that in the traditional night vision system there is no direct optical link between the object and viewer; but such a direct link is possible using the system 13. In a traditional night vision system a camera, such as a CCD, views the object 11 and electronically conveys the image to a direct view image display device. The viewer, such as viewer 10, for example, would only see the image generated by the display; the viewer cannot directly view the object. Therefore, a failure in the conventional night viewing system may result in the viewer not seeing anything; or a bright flash may result in the viewer not seeing anything, either due to the blinding caused by the flash as amplified by the night vision system or by a shuttering of the night viewing system to prevent such blinding, but unfortunately reducing or eliminating the image for viewing. In contrast, in the present invention a direct optical view of the object 11 is provided through the beamsplitter 12, while at the same time the projected image from the projector 16 is projected via the conjugate optics system to the viewer. This avoids the so-called "head-in-the-bucket" problem.

Another disadvantage of conventional night vision CCD devices, is that they are deliberately set to be extremely sensitive to low levels of light. consequently, if a high light level were to occur, the CCD would become saturated and "blinded". When this happens, the electronic signal to the image display of such device provides no definitive image. If the CCD were to become severely oversaturated, it could be permanently damaged. To prevent the latter, a protective device, such as a high speed automatic shutter, sometimes is employed to sense high light levels and to shutter the light before it reaches the CCD as to do damage thereto. The result, though, is that no image signal is generated by the CCD, and the user would see nothing. However, in the present invention, a high illumination level of the object 11 may saturate the camera 15, but at the same time that high illumination provides illumination of the object for the user 10 to view the object 11 directly. Also, a protective shutter for the camera may be employed without interfering with the direct view of the object.

The invention hereof may be used for a number of applications. One use is for night vision devices to enhance vision or to enable vision even at night when visible light is at a minimum. Another use is as a night driving aid to facilitate seeing while driving at night. Using the camera 15 of the invention to detect images that are beyond the range of the conventional headlights of an automobile, bus or truck, for example, those images may be projected by the projector 16 for viewing simultaneously with the driver's direct view of the road ahead able to be seen by the headlights. Safe driving can be enhanced because even though a driver may be "out-driving the headlights", the actual view seen by the driver may be beyond the range of the headlights. Another use of the invention is in aviation allowing a pilot to land at or to fly carefully to an area that is in relative darkness, such as in a field in an emergency situation, at a small airport which does not have runway lights or at an airport where there may be a power outage preventing illuminating of the runway. These are but several of many uses for the invention.

In an exemplary use of the invention for night driving or flying, appropriate head gear 40, such as a helmet, support straps, or other means may be worn by the viewer 10 to support the beamsplitters 12, 14, CCD 15 and projector 16. The retroreflector 18 may be mounted on the dashboard 41 of the vehicle 42, such as an automotive vehicle, or on another surface of an aircraft. The viewer 10 may look through the beamsplitter 12 and out through the windscreen 43 of the vehicle 41 to see directly an image of the object 11. The conjugate optics projection display with image enhancement 13, meanwhile picks up an image of the object by the CCD 15 and projects the image by the projector 16 through the beamsplitters 14, 12 toward the retroreflector 18 for reflection via the beamsplitter 12 to the viewer as was described above.

The camera 15 may be of a type which will pick up a view that is as wide as the view expected to be seen by the eye 10e of the viewer 10, and the conjugate optics system 13 of the invention is able to present a full view to the user 10, e.g., in the manner described in the above-mentioned patent applications. Therefore, the user is not restricted to a narrow field of view as in prior night vision devices; rather a wide field of view may be seen by the viewer, which view may be essentially the same as the field of view that is directly seen. By mounting the system 13 on the head or with respect to the head of the viewer, the field of view seen directly by the viewer and the image which is photographed by the camera 15 and projected by the projector 16 to the viewer can be always superimposed even as the head of the viewer is moved.

Another way in which the invention may be used is to photograph the object 11 or the scene containing the object 11 at a time different than the time that the object is being observed by the viewer 10 in real time. The previously-obtained image may be played back to the viewer for viewing simultaneously with the real or actual view being observed through the beamsplitter 12. Alternatively, the data provided to the projector 16 may be provided from a remote source, such as by radio signals, radar information, optical signals or the like. Consider the example illustrated in FIG. 3 hereof.

Figure 3:
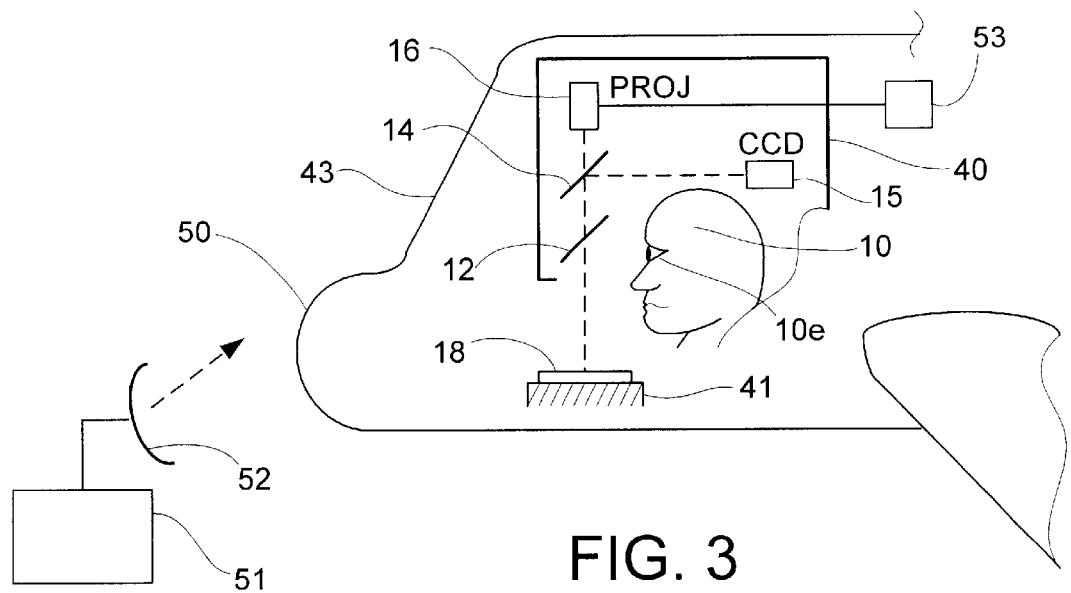
FIG. 3 is a schematic illustration of a system in accordance with an embodiment of the invention used in an aircraft or other vehicle and able to receive image data from a remote source.

In FIG. 3 data is provided to the projector 16 to project an image for viewing by a pilot viewer 10 in an aircraft 50. The data may be provided by a ground station 51, such as one at an airport. The ground station 51 may include a radio 52 and an antenna 53 or some other device for transmitting the data to the viewer 10; and the aircraft 50 may include a radio 53 or other device for receiving the data. The data may represent the view that is expected to be seen by the pilot viewer 10 of the airport when on a landing approach even though a direct view of the airport is obscured by clouds. Various head tracking devices also may be used in conjunction with the system 13 used in the way illustrated in FIG. 3; the head tracking devices can provide a filtering of the data received from the ground station 51 or can provide information, say by the radio 53, to the ground station to present appropriate data which would be expected to be seen by the pilot viewer 10 based on the direction that the pilot viewer is "looking" at a particular point in time. The data provided to the projector may take into consideration not only the direction that the pilot viewer is looking, but also it may take into consideration altitude, direction of approach to the airport, etc. Therefore, using the system 13 in combination with data provided from other than a camera that is simultaneously viewing the same object as the pilot, driver, etc. is or is trying to view, that individual can be presented with visual data that will facilitate and will enhance safe operation of the vehicle, whether automotive, aircraft, watercraft, spacecraft or other vehicle. The system 13 as used in an aircraft or other vehicle as is depicted in FIG. 3 also may employ the CCD 15 part of the system for the above-described function, such as to enhance the view in darkness, fog, or other vision obscuring condition.

Figure 2:
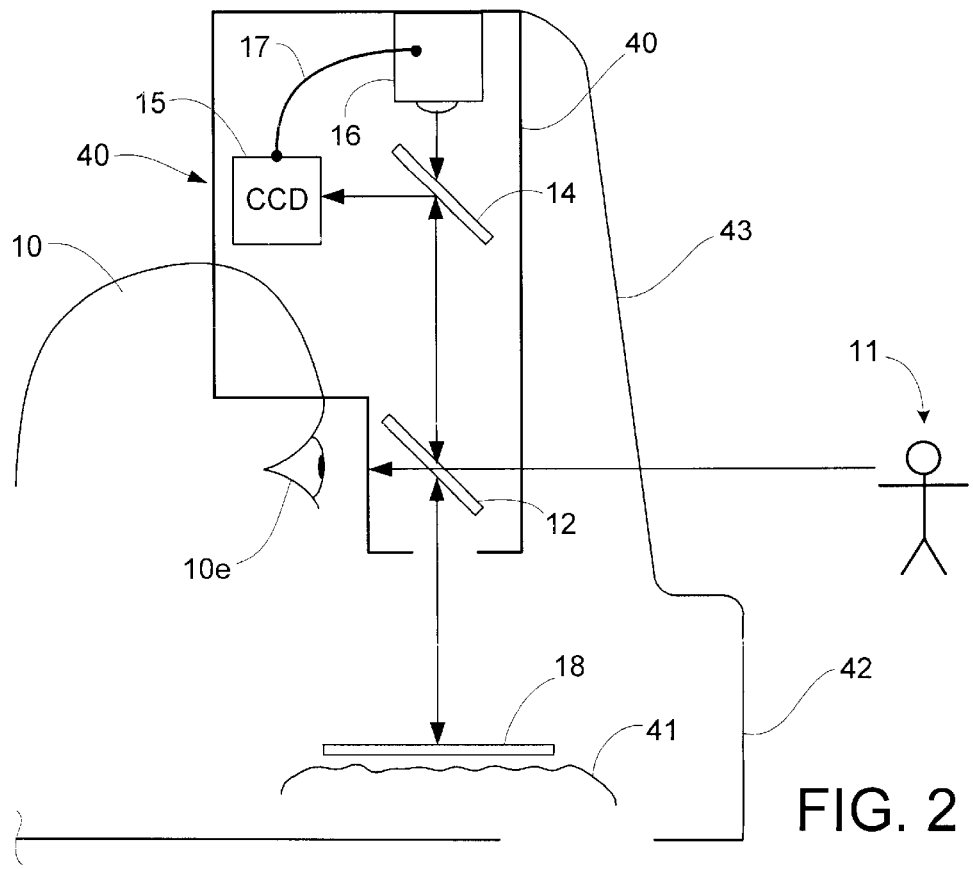
FIG. 2 is a schematic view of the system of FIG. 1 used as a head mounted system for a viewer in a vehicle, such as an automotive vehicle, aircraft, watercraft, etc.

In the conjugate optics projection system portion 13a of the system 13 the quality (resolution) of the projected image from the projector 16 depends on the resolution of the display of that projector and the resolution of the retroreflector 18. Usually the resolution of the display governs the overall resolution of the projected image. However, if the angular resolution of the retroreflector is large due to larger corner cube features included therein or the locating of the retroreflector very close to the viewer's eye 10e, the image resolution will be limited by the retroreflector 18. In the embodiment of FIGS. 1–3, the beamsplitter 12 and the retroreflector 18 are relatively close to the viewer's eye 10e, which could degrade the resolution or result in poor resolution of the projected image.

Figure 4:
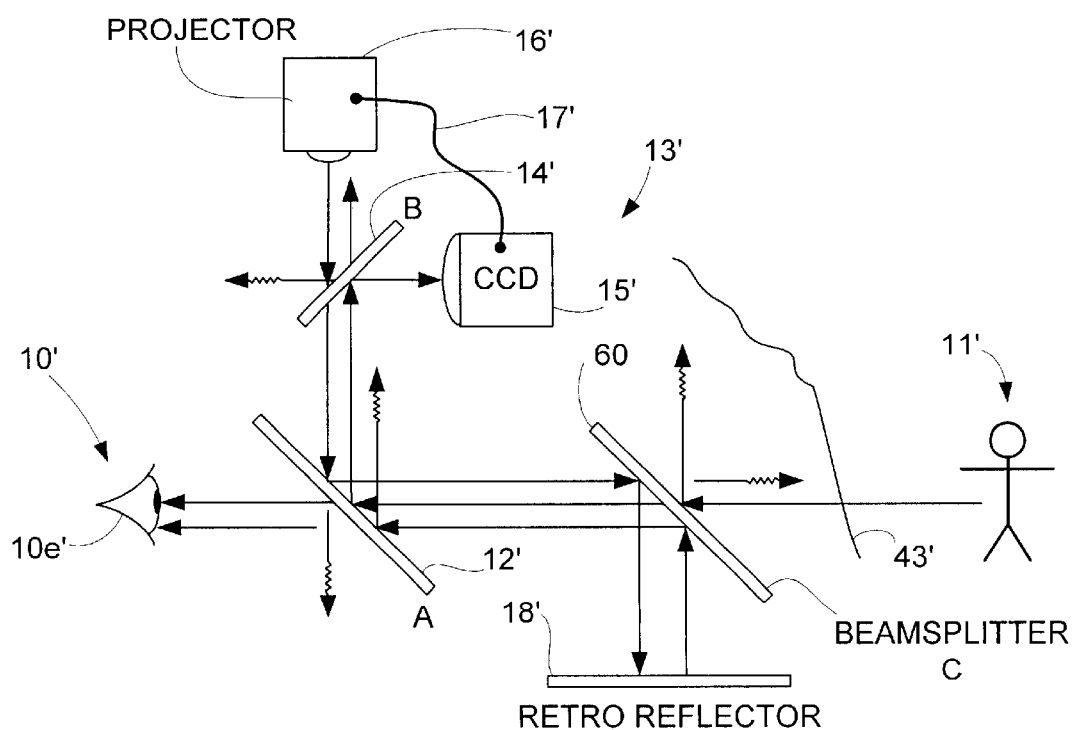
FIG. 4 is a schematic illustration of an alternate embodiment of the system of the invention using a relatively remotely spaced retroreflector and beamsplitter.

In FIG. 4, however, an alternative embodiment is illustrated in which a third beamsplitter 60 and the retroreflector 18' are located relatively farther from the viewer's eye 10e than is the case in the embodiments of FIGS. 1–3. Primed reference numerals designate parts in the system of FIG. 4 that generally correspond to parts identified in the earlier figures by unprimed reference numerals. In the system 13' the CCD 15', projector 16' and beamsplitters 12' and 14' are all located proximate to the viewer's eye 10e, e.g., which would be the case for a head mounted system using head gear 40 mentioned above. Also, in the system 13' of FIG. 4, the beamsplitter 60 and the retroreflector 18' are a substantial distance away, e.g., at the aircraft windshield (windscreen) relative to the CCD 15', projector 16' and viewer 10'.

The arrangement of parts of the embodiment of system 13' of FIG. 4 not only improves the angular resolution of the retroreflector 18', but also permits the use of multiple remote retroreflector/beamsplitter combinations. For example, retroreflector 18' and beamsplitter 60 combinations could be place at the side windows of an aircraft, thereby providing night vision capability in any direction that the pilot points his or her head. The direct view feature still is retained in this embodiment of the system 13'.

The beamsplitters shown in the various embodiments can be "tuned" for the application. Their transmission/reflection ratios can be adjusted for optimum performance. Further, the transmission/reflection ratios can be adjusted for specific wavelengths. For example, a beamsplitter can be tuned to be highly reflective in the infrared and highly transmissive in the visible bandwidth.

Also, narrow band filters may be used in various portions of the optical paths, in order to further enhance overall performance of the systems 13, 13' and other equivalent embodiments of the invention. For example, with reference to the embodiment illustrated in FIG. 1, a color notch filter may be placed in the light path 20 between the object 11 and the beamsplitter 12. The filter may be selected to filter out the wavelength(s) of light produced by the projector 16. Thus the actual view of the object 11 seen by the viewer 10 has these wavelength(s) of light at least partially removed by the filter. However, the image projected by the projector 16 includes these wavelengths of light, thus "filling in" the combined actual view and view of the image seen by the viewer 10.

With the foregoing in mind, then, an aspect of the invention relates to a device or a system for enhancing vision by imaging and projecting in a conjugate path an image separated either by spectral region or by computer generation from a direct view.

Another aspect is to use infrared, ultraviolet or other detection of object information and based on that information converting the same to image information in the visible range and projecting the information in superposition with a direct view of the object.

Another aspect relates to a system using a camera, such as a video camera, CCD or other camera, in a conjugate path with a projection device such that the electronic image from the camera falls at the same position as the object in space.

Other aspects include use of the above for infrared viewing, for night vision, for aircraft control, for input to a controlling individual of a vehicle, aircraft, or the like either by simultaneous projection of detected view while direct view is possible or by providing supplemental view from another source, such as a remote station, a prerecorded image, etc.

What is claimed is:

1. A method of displaying information, comprising projecting an image in overlaid relation on an actual view of an object, wherein the image is from a same point of view as the actual view, and is of at least part of the actual view or of a missing part of the actual view.

2. The method of claim 1, wherein as viewed the actual view and the image are identical in size, shape and scale.

3. The method of claim 1, wherein as viewed the actual view and the image are substantially registered with each other.

4. The method of claim 1, wherein as viewed the actual view and the image are of different color or wavelength.

5. The method of claim 4, wherein the image is obtained in a non-visible spectrum.

6. The method of claim 5, wherein the image is obtained as an infrared image.

7. The method of claim 6, further comprising the step of converting the infrared image to an image in the visible bandwidth for viewing by a person.

8. The method of claim 1, wherein the projecting includes reflecting the image off of a retroreflector which is positioned such that the retroreflector does not impinge on the actual view.

9. The method of claim 1, wherein the image is an image obtained by a camera.

10. The method of claim 1, further comprising delivering the image by projection via a projector and conjugate optics, for superpositioning with respect to the actual view for viewing by a user.

11. A system for enhancing vision comprising
   means for obtaining an actual view of an object from a point of view,
   means for obtaining an image of an actual part or a missing part of the actual view from the point of view; and
   means for superimposing said the image on the actual view such that the image enhances viewing of the object, the means for superimposing including imaging and projecting means for projecting in a conjugate path the image;
   wherein as viewed the actual view and the image are separated by spectral region or by computer generation.

12. The system of claim 11, wherein the means for obtaining the image includes a detector for detecting an infrared, ultraviolet or other detectable feature of object information and based on that information converting the same to image information in the visible range, and the means for superimposing comprises means for projecting the information in superposition with the actual view of the object.

13. The system of claim 11, wherein the means for obtaining the image includes a camera in a conjugate path with a projection device to produce an electronic image of the object such that the electronic image from the camera falls at the same position as the object in space.

14. The system of claim 11, wherein the means for obtaining the image includes an infrared detector.

15. An apparatus for night vision, for vehicle or aircraft control, for input to a controlling individual of the vehicle or aircraft by simultaneous projection of an image of a detected view while direct viewing of the view is possible, comprising the system of claim 11 to obtain the view and the image.

16. The apparatus of claim 15, further comprising means for producing a supplemental view from another source, for combining with at least one of the image and the direct view.

17. A method of displaying information, comprising,
   projecting an image in overlaid relation on an actual view of an object, wherein the image is obtained in a non-visible spectrum and the actual view of the object is obtained or provided in the visible spectrum, the actual view of the object and the image being from a same point of view.

18. A system for enhancing vision comprising:
   a beamsplitter which allows a view of an object to at least partially pass therethrough; and
   a projector which projects onto the beamsplitter an image that represents, from a same point of view as the view of the object, an actual part or a missing part of the view, such that at least part of the image is superimposed on the view of the object.

19. The system of claim 18, wherein the image is a previously-obtained image.

20. The system of claim 18, further comprising a remote source which provides data to the projector for use in projecting the image.

21. The system of claim 20, wherein the remote source includes a radio transmitter, and further comprising a radio receiver for receiving signals from the transmitter, the receiver being operatively coupled to the projector.

22. The system of claim 20, further comprising a head tracking device providing information representative of the direction that a viewer is facing to view the object for use to indicate the point of view of the image provided for viewing.

23. The system of claim 20, further comprising a head tracking device operatively coupled to the remote source to provide head position information to the remote source, the data being selected at least in part based on the head position information.

24. A system for enhancing vision comprising:
- a beamsplitter which allows a view of an object to at least partially pass therethrough;
- a projector which projects onto the beamsplitter an image that represents an actual part or a missing part of the object as viewed, such that at least part of the image is superimposed on the view of the object; and
- a detector which receives at least some of a reflected portion of the view of the object which is reflected by the beamsplitter, the detector being operatively coupled to the projector to provide data to the projector for use in projecting the image.

25. The system of claim 24, wherein the detector detects an infrared, ultraviolet or other detectable feature of object information and based on that information the projector projects the image in the visible range.

26. The system of claim 24, wherein the detector detects non-visible light and the projector projects the image in the visible range based on the non-visible light detected by the detector.

27. The system of claim 18, wherein the beamsplitter is a first beamsplitter, and further comprising a second beamsplitter optically coupled to the first beamsplitter.

28. A system for enhancing vision comprising:
- a first beamsplitter which allows a view of an object to at least partially pass therethrough,
- a projector which projects onto the first beamsplitter an image that represents an actual part or a missing part of the view of the object, such that at least part of the image is superimposed on the view of the object,
- a second beamsplitter optically coupled to the first beamsplitter,
- a third beamsplitter optically coupled to the first and second beamsplitters, and
- a retroreflector optically coupled to the third beamsplitter,
- wherein the third beamsplitter and the retroreflector are a substantial distance away from the detector and the projector.

29. The system of claim 28, wherein the detector and the projector are part of a head mounted display and the located at a windshield or window.

30. The system of claim 18, further comprising a retroreflector for reflecting the image.

31. The system of claim 18, further comprising means for providing image data to the projector.

32. The system of claim 30, wherein the retroreflector does not allow light to pass therethrough.

33. The system of claim 11, wherein the projecting means includes a retroreflector positioned outside the actual view from the point of view.

34. The method of claim 17, wherein the projecting includes reflecting the image off or a retroreflector which is positioned such that the retroreflector does not impinge on the actual view.

35. The system of claim 24, further comprising a retroreflector operatively coupled to the projector.

36. The system of claim 11, wherein the means for obtaining the actual view includes an optical filter.

37. The system of claim 18, further comprising an optical filter between the beamsplitter and the object which at least partially filters out one or more wavelengths of light from the actual view.

38. The system of claim 37, wherein the projector projects light including the one or more wavelengths.

39. The system of claim 24, further comprising an optical filter between the beamsplitter and the object which at least partially filters out one or more wavelengths of light from the actual view.

40. The system of claim 39, wherein the projector projects light including the one or more wavelengths.

41. The system of claim 1, wherein the image is a real image.

* * * * *